United States Patent
Cheng et al.

(10) Patent No.: US 11,579,705 B1
(45) Date of Patent: Feb. 14, 2023

(54) PHOTODETECTOR ACTIVATIONS

(71) Applicant: HEWLETT-PACKARD DEVELOPMENT COMPANY, L.P., Spring, TX (US)

(72) Inventors: Yuan Hsi Cheng, Taipei (TW); Wan-Chieh Lu, Taipei (TW); Cheng-Kai Chen, Taipei (TW); Ming-Fong Chou, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/573,742

(22) Filed: Jan. 12, 2022

(51) Int. Cl.
| | |
|---|---|
| G06F 3/01 | (2006.01) |
| G06F 3/0346 | (2013.01) |
| G06F 3/03 | (2006.01) |
| G01J 1/42 | (2006.01) |

(52) U.S. Cl.
CPC ............ G06F 3/017 (2013.01); G06F 3/0304 (2013.01); G06F 3/0346 (2013.01); *G01J 1/4204* (2013.01)

(58) Field of Classification Search
CPC ...... G06F 3/017; G06F 3/0304; G06F 3/0346; G01J 1/4204
See application file for complete search history.

(56) References Cited

U.S. PATENT DOCUMENTS

| | | | |
|---|---|---|---|
| 7,406,612 B2 | 7/2008 | O'Connor | |
| 8,922,485 B1* | 12/2014 | Lloyd | H04M 1/6505 |
| | | | 345/158 |
| 9,256,290 B2 | 2/2016 | Mankowski | |
| 10,216,266 B2* | 2/2019 | Krulce | G06F 21/32 |
| 10,571,973 B2* | 2/2020 | Xu | G01R 33/093 |
| 11,055,111 B2* | 7/2021 | Zhu | G06F 9/44505 |
| 2006/0139185 A1 | 6/2006 | Bonnat | |
| 2015/0177865 A1* | 6/2015 | Rodzevski | G06F 3/0304 |
| | | | 345/175 |
| 2016/0109914 A1 | 4/2016 | Blum | |
| 2016/0358585 A1* | 12/2016 | Mankowski | G06F 3/0421 |
| 2018/0096120 A1* | 4/2018 | Boesen | H04R 1/1016 |
| 2018/0121012 A1* | 5/2018 | Asrani | G06F 1/1626 |
| 2018/0129262 A1* | 5/2018 | Veiga | G06F 3/0488 |
| 2018/0356904 A1* | 12/2018 | Disano | G06F 3/0488 |
| 2019/0034001 A1* | 1/2019 | Tanabe | G06F 3/0304 |
| 2019/0287380 A1* | 9/2019 | Verbeke | H05B 47/19 |
| 2022/0214725 A1* | 7/2022 | Shah | G06F 1/1675 |

* cited by examiner

*Primary Examiner* — Grant Sitta
(74) *Attorney, Agent, or Firm* — Knobbe, Martens, Olson & Bear, LLP

(57) ABSTRACT

An example computing device includes a photodetector to measure an amount of light incident on a detection surface of the photodetector. The example computing device includes a state sensor to activate the photodetector responsive to the computing device being in a detection state. The example computing device also includes a processor. An example processor identifies, during the detection state, a user gesture based on an output of the photodetector. The user gesture blocks light incident on the detection surface of the photodetector. The example processor also alters an operation of the computing device based on the user gesture.

20 Claims, 5 Drawing Sheets

| | |
|---|---|
| Machine-Readable Storage Medium 514 ||
| 516 | Detect State Instructions |
| 518 | Activate Photodetector Instructions |
| 520 | Measure Light Instructions |
| 522 | Identify Gesture Instructions |
| 524 | Identify Hardware Component Instructions |
| 526 | Change Operational State Instructions |

*Fig. 5*

PHOTODETECTOR ACTIVATIONS

BACKGROUND

Computing devices include hardware components that individually and collectively execute a wide variety of computing operations. For example, a computing device may include a processor, a memory device, a graphics card, a sound card, transistors and circuitry to connect these and other hardware components. Each of these hardware components have settings that may be adjusted to carry out different functionality. For example, a microphone and/or speaker may be activated or deactivated to allow or prevent audio input and output respectively.

BRIEF DESCRIPTION OF THE DRAWINGS

The accompanying drawings illustrate various examples of the principles described herein and are part of the specification. The illustrated examples are given merely for illustration, and do not limit the scope of the claims.

FIG. 5 depicts a non-transitory machine-readable storage medium for activating a photodetector, according to an example.

Figure 1:
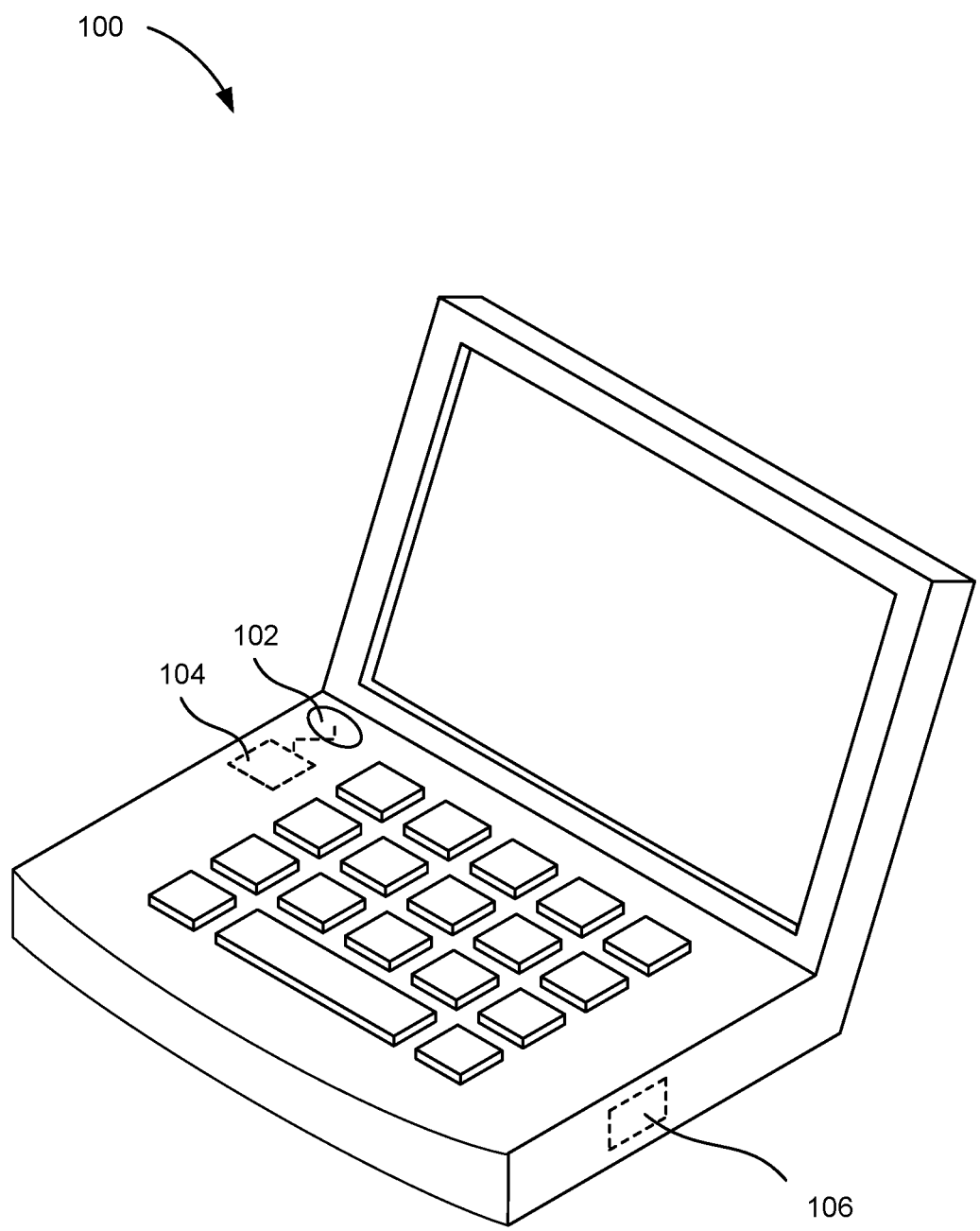
FIG. 1 depicts a computing device for activating a photodetector, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Computing devices are used by millions of people daily to carry out business, personal, and social operations and it is not uncommon for an individual to interact with multiple computing devices on a daily basis. Examples of computing devices include desktop computers, laptop computers, all-in-one devices, tablets, and gaming systems to name a few. A computing device may include any number of hardware components. These hardware components operate with other hardware components to execute a function of the computing device. Some hardware components are referred to as input or output devices and allow the user to interface with the computing device. Example input and output devices include microphones, cameras, and speakers among others. While specific reference is made to particular hardware components, a computing device may include a variety of types of hardware components. The computing device also includes program instructions that work to perform operations at the computing device.

These hardware components and others may be under user control and may be adjusted accordingly. For example, a microphone can be turned on or off to selectively receive audio. Similarly, a speaker and camera can be turned on and off to selectively output audio or record video.

As computing devices are becoming more ubiquitous in society, some developments may further enhance their integration. For example, given the increase in functionality of a computing device and the increased variety and types of hardware devices, the amount of control a user has over the computing device may be daunting to a user. Accordingly, a computing device may enable certain "quick functions" or "shortcuts" to quickly alter a hardware setting. Enabling these quick functions enhances the efficiency of computing device usage as a user does not have to navigate through complex and layered menus to identify the hardware function they want to alter.

For example, to unmute or mute a microphone the "Fn" and "F8" keys may be depressed simultaneously. However, there may be a large amount of these quick functions, and a user may not be able to keep track of which key combinations execute which quick functions. Moreover, it may be the case that a user intending to strike the "Fn" and "F8" keys simultaneously, may inadvertently depress another key combination which executes a different, and unintended function.

In some examples, a computing device may include an accelerometer to detect a physical tap of the computing device housing. This "tap" may be mapped to a particular operation to execute. However, tap detection is susceptible to mis-interpretation. For example, the movement of the computing device, such as a laptop being moved from one desk to another, may also trigger the accelerometer and associated function. That is, the accelerometer may not be able to distinguish between a "tap" and a movement of the computing device. Moreover, the accelerometer may detect other uses of the computing device and interpret this other use as a "tap" to execute a quick function. For example, a user may be typing on a keyboard. Each depression of a key may trigger the accelerometer to trigger a quick function. In other words, a computing device may not be able to differentiate a tap to execute a quick function from movements and other taps which are not intended to execute a quick function. Accordingly, the present specification describes a computing device that relies on an ambient light sensor to replace, or supplement, a quick input function of an accelerometer.

Specifically, the computing device may include a photodetector such as an ambient light sensor (ALS). A user gesture over, or tap on, the ALS may alter the light measurements received at the ALS, which light measurements may be mapped to a particular quick function. Put another way, as a user gestures over the ALS, or taps the ALS, the amount of light incident on the detection surface of the ALS decreases. This decrease in the amount of light incident on the ALS may itself trigger a quick function, or may be used in conjunction with a detected tap by the accelerometer to execute the quick function. Accordingly, the ALS may act as a main or secondary input device to prevent false identification of a quick function to be executed.

In some examples, an additional sensor may be used to further prevent mis-identification of a quick function input. For example, to make sure the reduction of light incident upon the photodetector results from a user action, and not some other condition such as the lid of the laptop being closed, the computing device may include an additional state sensor such as a hall sensor, hinge angle sensor, or time-of-flight camera (e.g., implemented using a time-of-flight sensor), to determine that the computing device is in a state wherein the photodetector can, and should, collect light measurement data to interpret user gestures or taps.

Specifically, the present specification describes a computing device. The computing device includes a photodetector to measure an amount of light incident on a detection surface of the photodetector. The computing device also includes a state sensor to activate the photodetector responsive to the computing device being in a detection state. A processor of the computing device identifies, during the detection state, a user gesture based on an output of the photodetector. The user gesture blocks light incident on the detection surface of the photodetector. The processor also alters an operation of the computing device based on the user gesture.

In another example, the computing device includes an ambient light sensor to measure an amount of light incident on a detection surface of the ambient light sensor and a presence sensor to detect a user presence in front of the computing device. In this example, the processor activates the ambient light sensor responsive to user presence in front of the computing device and identifies a user gesture based on a first light measurement and a second light measurement from the ambient light sensor. The user gesture blocks light incident on the detection surface of the ambient light sensor. The processor differentiates a first user gesture from a second user gesture based on a sequence of light measurements from the ambient light sensor and switches an operational state of a hardware component of the computing device responsive to a user gesture.

The present specification also describes a non-transitory machine-readable storage medium encoded with instructions executable by a processor of a computing device. The instructions, when executed by the processor, cause the processor to detect a user presence in front of the computing device and activate a photodetector responsive to user presence in front of the computing device. The instructions are also executable by the processor to cause the processor to measure an amount of light incident on a detection surface of the photodetector, receive a first light measurement from the photodetector, and receive a second light measurement from the photodetector. Based on a difference between the first light measurement and the second light measurement, the instructions are executable by the processor to identify a user gesture which blocks light incident on the detection surface. The instructions are executable to identify from the user gesture, a hardware component of the computing device and a change to an operational state of the hardware component and change the operational state of the hardware component based on the user gesture.

Turning now to the figures, FIG. 1 depicts a computing device 100 for activating a photodetector 102, according to an example. The computing device 100 may be of a variety of types including a desktop computer, laptop computer, all-in-one device, tablet, mobile devices, smartphones, or gaming system to name a few. As described above, the computing device 100 of the present specification relies on a photodetector 102 to supplement or replace an accelerometer, which accelerometer detects a user "tap" and executes a quick function based thereon. Accordingly, the computing device 100 includes a photodetector 102 that measures an amount of light incident on a detection surface. A photodetector 102 may include a detection surface that is sensitive to photons and converts the detected light into a voltage or current. In one particular example, the photodetector is an ambient light sensor.

As described above, this photodetector 102 is used as an input detection component. That is, as a user taps, or gestures over the photodetector 102, the user hand or finger blocks the light incident on the photodetector 102 such that less light impinges on the detection surface. This reduced amount of light, or change in the light measurement from the photodetector 102, may be mapped to a particular quick function to execute.

As noted above, the light measurement output from the photodetector 102 may replace or supplement the accelerometer output. In a first example, the processor 106 is triggered to execute a quick function when both 1) the accelerometer detects a tap input and 2) the photodetector 102 detects a reduced amount of light incident upon the detection surface. Using the photodetector 102 to supplement the accelerometer prevents false positive determination. For example, movement of a closed laptop computing device 100 in a bag may result in an accelerometer measurement that could trigger a quick function. However, the output of the photodetector 102 while being in a bag may be constantly low due to the computing device 100 being closed. Accordingly, this constant reading from the photodetector 102 may prevent a trigger of the execution of the quick function.

As another example, the photodetector 102 may replace the accelerometer as triggering a particular action. For example, a blockage of the photodetector 102 may indicate a user gesture or tap on the photodetector 102. This reduction in the light measurement on the photodetector 102 itself may trigger a quick function.

However, to prevent the inadvertent triggering of an input due to a reduced indication of incident light on the photodetector 102, the computing device 100 may include an additional component. Specifically, the computing device 100 includes a state sensor 104 to activate the photodetector 102 responsive to the computing device being in a detection state. That is, the state sensor 104 may be coupled to the photodetector 102 as indicated by the dashed line in FIG. 1 and may activate the photodetector 102 when certain conditions are met.

The state sensor 104 may take a variety of forms. In one particular example, the state sensor 104 may be an accelerometer to detect physical user interaction with the computing device 100. For example, the accelerometer may detect that a user strikes the computing device 100 at a set location on the computing device 100. Responsive to this detected strike, the photodetector 102 may be activated to detect user gestures and/or taps as triggers to quick functions.

In another example, the state sensor 104 is a hinge angle sensor. The hinge angle sensor is an electronic component that can detect the angle between a keyboard section of a laptop computing device 100 and a display section of the laptop computing device 100. When the hinge angle sensor is less than a threshold acute angle amount or 0, it is indicative that a user is not actively using the computing device 100. As such, the photodetector 102 may be de-activated. Such a condition prevents a light-blocking scenario, such as when the laptop computing device 100 is closed, from triggering a quick function. That is, the photodetector 102 relies on light blocking to trigger a quick function. Some light blocking is intended to trigger a quick function, i.e., a user finger blocking the photodetector 102, while other light blocking is not intended to trigger a quick function, such as when the lid closes and blocks ambient light from impinging on the detection surface. Including a hinge angle state sensor 104 prevents this second type of light blocking situation from triggering a quick action.

The state sensor 104 may be a hall sensor, which is a magnetic field sensor whose signal changes when a magnetic field is present. Accordingly, when a magnet in a display portion of the computing device 100 is near a magnet in a keyboard portion of the computing device 100, such as when the computing device 100 is closed, a signal is generated due to the magnetic field between the magnets. However, when that field does not exist due to the magnets being separated upon opening the computing device 100, the signal is interrupted. This hall sensor may similarly be used to detect when a computing device 100 is open and thus in a state wherein the photodetector 102 should be activated to detect user gesture and/or tap. While particular reference is made to particular state sensors 104. A variety of state sensors 104 may be implemented in accordance with the principles described herein.

As described above, the state sensor 104 may trigger activation of the photodetector 102. Once triggered, an output of the photodetector 102 is passed to the processor 106 for identification of a gesture. That is, the processor 106 identifies, during a detection state, a user gesture based on an output of the photodetector 102, which user gesture blocks light incident upon the detection surface of the photodetector 102. That is, a user gesture (which in some examples is a tap) in front of or on the photodetector 102 blocks an amount of light that impinges on the photodetector 102 such that a light measurement from the photodetector 102 changes based on whether or not a user hand is gesturing in front of the photodetector 102. Light measurements, a first measurement indicating a higher light measurement indicating no blockage and a second measurement indicating lower light which indicates light blockage, is passed to the processor 106. From these sequential measurements, the processor 106 indicates that a gesture or tap has been made and alters an operation of the computing device 100 based on the user gesture.

The nature and type of alteration may take a variety of forms. For example, a computing device 100 includes a variety of hardware components which include input/output devices. In an example, the hardware component that is adjusted is such an input/output device. Specific examples of input/output devices that may be altered and other non-input/output devices that may be altered include a microphone of the computing device 100, a speaker of the computing device 100, a camera of the computing device 100, a network interface card of the computing device 100, or combinations thereof.

There are any number of ways that these hardware components may be adjusted based on a photodetector 102 triggered input. For example, these devices could be activated or deactivated, or operational settings changed. In addition to changing operation of a hardware component, the alteration may be to program instructions. For example, due to a photodetector 102 triggered input, a screen capture operation may be executed, or a web browser, video stream, audio stream, or other application may be opened. That is, the present computing device 100 includes a photodetector 102 input used to alter operation of the computing device 100. However, rather than being continuously active, such photodetection is triggered by the computing device 100 being in a detection state. This avoids false positive detection of user inputs as described above.

Figure 2:
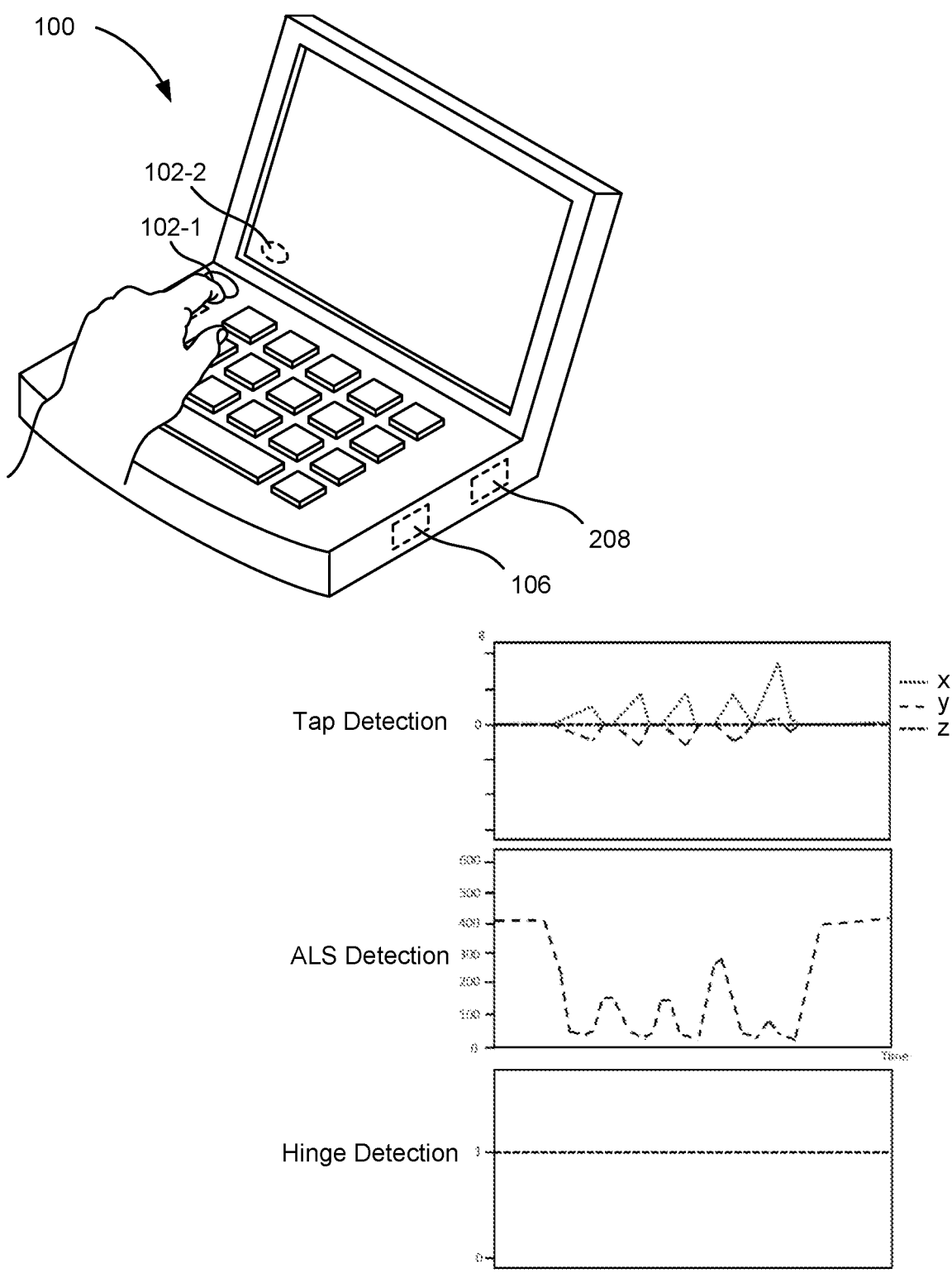
FIG. 2 depicts a computing device for activating a photodetector, according to an example.

FIG. 2 depicts a computing device 100 for activating a photodetector 102, according to an example. In the example depicted in FIG. 2, the state sensor 104 is an accelerometer which is hidden below the user's finger. As described above, the accelerometer may confirm the user gesture which is defined based on an output of the photodetector 102. In another example, the photodetector 102 may confirm the tap of the accelerometer.

That is, it may be that the accelerometer serves as a user input device as a user taps on the region of the computing device 100 that is adjacent the accelerometer. In this example, the gesture input is a physical tap on the photodetector 102. However, as noted above relying entirely on an accelerometer may lead to false positive identification of a function-triggering user action. Accordingly, blockage of the photodetector 102 near the accelerometer may confirm that a tap was intended. As such, the output of two devices may be used by the processor 106 to determine a user gesture. The first is the output of the photodetector 102 as depicted in FIG. 2 which indicates a light blockage and the second is an output of the accelerometer which indicates a physical touch of the user. In the graphs depicted in FIG. 1, the accelerometer has an output unit of "g" which is the acceleration of gravity and has a value of 9.8 meters per second squared (m/s$^2$) and the photodetector 102 has a unit of Lux which is a unit of illuminance. As such, the processor 106 may rely on multiple criteria to determine whether a light blockage at the photodetector 102 should be treated as a user input.

As yet another example, an output of a hinge angle sensor or a hall sensor may be used to indicate whether it is likely that a detected acceleration and/or light measurement is indicative of a gesture. For example, if the lid of a laptop computing device 100 is closed (indicated by a binary output of "0"), while a sub-threshold light measurement, and positive acceleration are detected, the processor 106 may determine this is not intended to be a gesture input based on the combination of outputs. Accordingly, the computing device 100 avoids a laptop computing device 100 being closed as triggering the execution of a quick function.

In some examples, the processor 106 may be able to distinguish different gestures based on a sequence of light measurements. For example, a user may perform a single tap or a double tap of the photodetector 102. Accordingly, the processor 106 may differentiate between a first user gesture, which is a tap of an ambient light sensor and a second user gesture, which may be a double tap of the ambient light sensor. Such a differentiation may be based on an amount of time between differing light measurements. For example, if a photodetector 102 transmits a high measurement, followed by low, high, and low measurements within a time period of less than a second, the processor 106 may identify this as a "double tap" of the photodetector 102.

Note that while specific reference is made to a tap user gesture, any variety of gestures may be detected by the photodetector 102 and processor 106 interaction. In any example, the computing device 100 may include a physical indicium of a gesture region where the photodetector 102 is to detect a user gesture input, whether the gesture input be a physical tap or movement in proximity, but not contacting, the photodetector 102.

FIG. 2 also depicts various locations for the photodetector 102. For example, the photodetector 102-1, or ambient light sensor, may be disposed in a bezel of the computing device 100 as depicted in FIG. 2. In another example, the photodetector 102-2 may be disposed under a display panel of the computing device, also as depicted in FIG. 2. While FIG. 2 depicts two particular examples of locations of the photodetector 102, the photodetector may be placed at a variety of locations including any location not covered by hands or other objects during expected use, such as typing or otherwise interfacing with the computing device 100.

FIG. 2 also depicts the computing device 100 as having a database 208 that includes a mapping between identified user gestures and alterations. In some examples, the alterations that are performed are defined by a manufacturer or administrator. In other cases, the computing device 100 may present a user interface that allows a user to define which actions they want executed responsive to a particular gesture detected by the photodetector 102. Accordingly, the computing device 100 may include a database 208 of such actions such that the processor 106 may identify hardware components, and how those hardware components are to be altered based on a detected user gesture.

Figure 3:
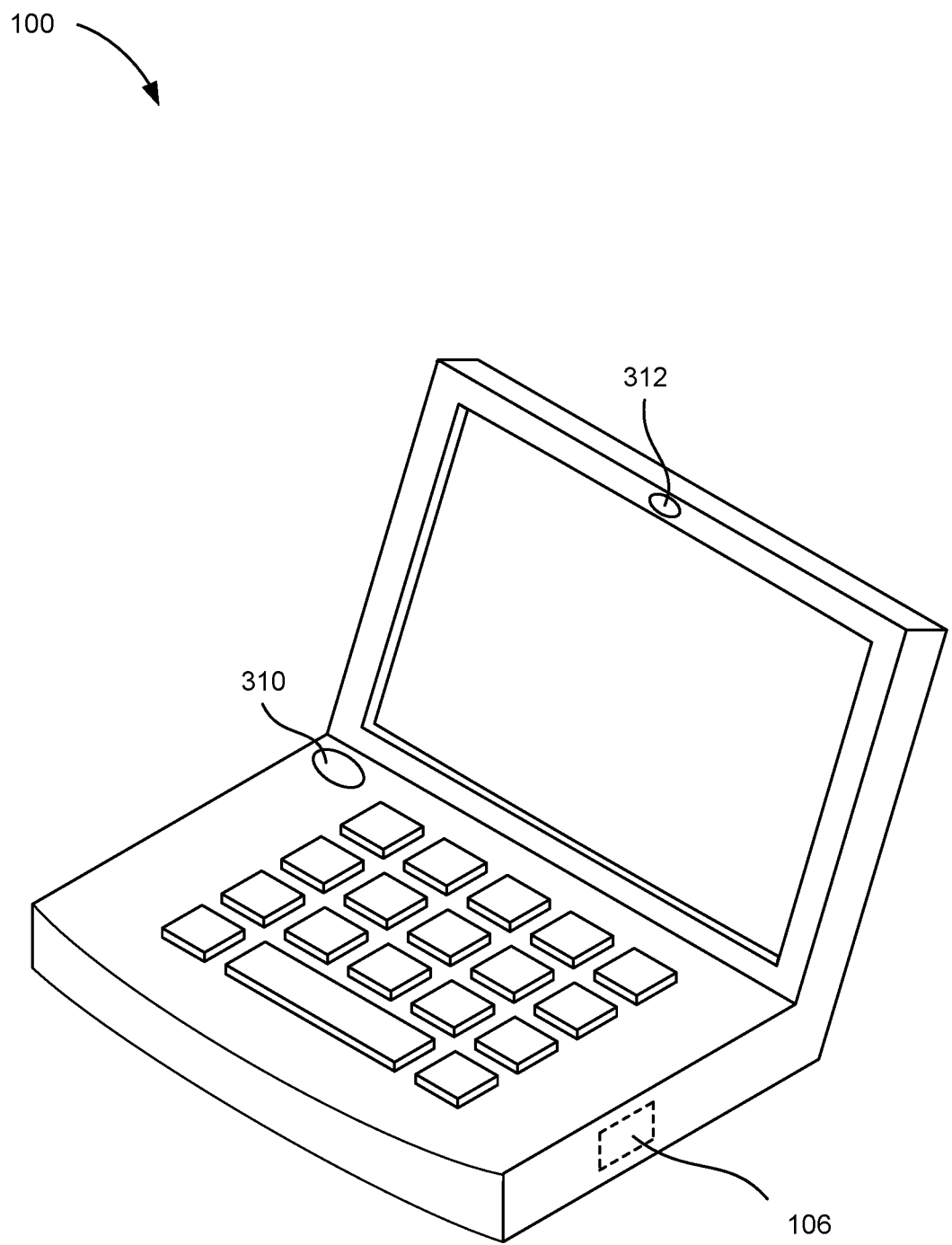
FIG. 3 depicts a computing device for activating a photodetector, according to an example.

FIG. 3 depicts a computing device 100 for activating a photodetector 102, according to an example. Specifically, in the example depicted in FIG. 3, the photodetector 102 is an ambient light sensor 310 to measure an amount of light incident on a detection surface of the ambient light sensor 310. In the example depicted in FIG. 3, the state sensor 104 is a presence sensor 312 which may detect a user presence in front of the computing device 100. Such a presence sensor 312 may work in a variety of ways. For example, the presence sensor 312 may be a time-of-flight camera which is a range imaging camera system that determines whether a user is sitting in front of the computing device 100. As with the state sensor 104, the presence sensor 312 indicates whether someone is actively using the computing device 100. As such, the presence sensor 312 may prevent indication of quick functions through the ambient light sensor 310 when no user is present and thus prevents a condition in which the ambient light sensor 310 detects low light and mistakenly indicates the low light condition as a user-initiated gesture in front of the ambient light sensor 310.

While particular reference is made to a time-of-flight camera presence sensor 312, a variety of other types of presence sensors 312 may be implemented in accordance with the principles described herein such as an artificial intelligence camera, microwave sensor, facial recognition sensor, eye-tracking sensor, or a combination thereof.

In this example, the processor 106 may activate the ambient light sensor 310 responsive to user presence in front of the computing device 100. Also as described above, the processor 106 identifies a user gesture based on a first light measurement and a second light measurement from the ambient light sensor 310. The user gesture, whether the user gesture be contact-based or proximity-based, blocks incident light on the detection surface of the ambient light sensor 310.

The processor 106 may differentiate a first user gesture from a second user gesture based on a sequence of light measurements from the ambient light sensor. For example, if within a threshold period of time, the light measurement outputs from the ambient light sensor 310 are high (indicating no blockage from a user) and then low (indicating blockage from a user), the processor 106 may identify this as a single tap input. If within the same threshold period of time the light measurement outputs from the ambient light sensor 310 are high (indicating no blockage from a user, low (indicating blockage form a user), high (indicating no blockage from a user), and low (indicating blockage from a user), the processor 106 may identify this as a double tap input. As described above, the processor 106 may switch an operational state of a hardware component of the computing device 100 responsive to a user gesture.

Figure 4:
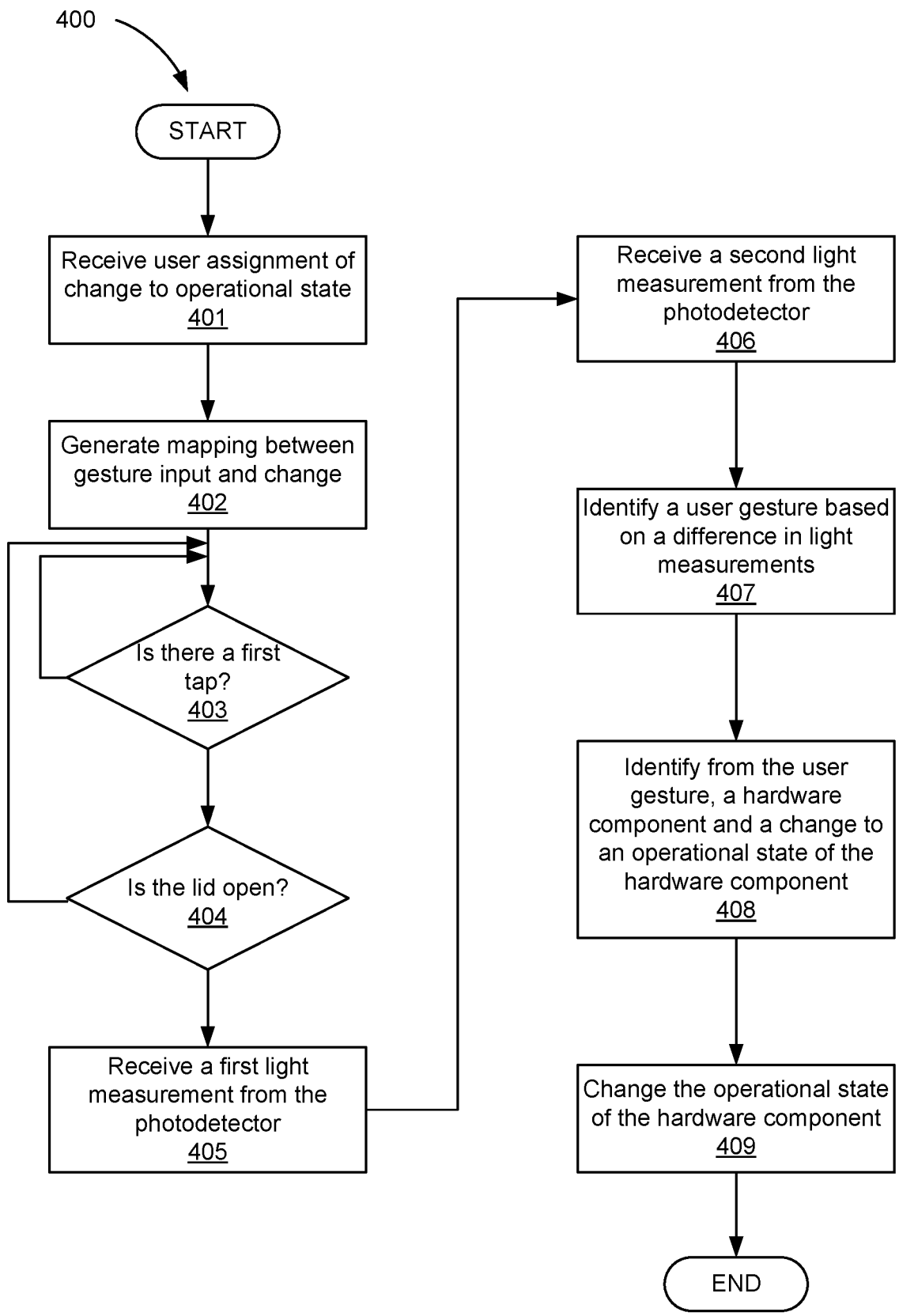
FIG. 4 is a flowchart of a method for activating a photodetector, according to an example.

FIG. 4 is a flowchart of a method 400 for activating a photodetector 102, according to an example. At step 401, the method 400 includes receiving a user indication of the change of the operational state of the hardware device to assign to the user gesture. That is, as described above, there are any variety of quick functions that may be executed responsive to a user gesture detected at the photodetector 102 and in some cases, the quick function may be user-defined. Accordingly, the computing device 100 may present a user interface which allows the user to assign or train the processor 106 to execute a particular quick function when a particular user gesture is executed in front of the photodetector 102.

At step 402, the method 400 includes generating a mapping between the user-created gesture input and a state to which the hardware component is to be set. That is, following assignment of an alteration to a user gesture, the alteration that is to occur is stored, for example, in a database 208 on the computing device 100 or accessible to the computing device 100.

In some examples, the state sensor 104 may detect that the computing device 100 is in the detection state based on a first detected condition and a second detected condition. That is, as depicted in FIG. 2, multiple criteria may be used to determine when a particular light measurement sequence is to be used as a gesture input. In one particular example, the first detected condition is a user physical interaction at a particular region of the computing device 100 and the second detected condition may be an open state of the computing device 100. Accordingly, at step 403, the method 400 includes determining whether there is a first tap of the state sensor 104. If there is no detected tap, step 403 determination NO, the method 400 continues to monitor for a first tap.

If there is a detected tap, step 403 determination YES, at step 404, the method 400 includes determining if the lid of a laptop computing device 100 is open. If not, step 404 determination NO, the method 400 continues to monitor for a first tap. If it is determined that the lid is open, step 404 determination YES, at steps 405 and 406, the method 400 includes receiving a first light measurement from the photodetector 102 and receiving a second light measurement from the photodetector 102. As described above, differences from these light measurements may indicate a particular user gesture. Accordingly, at step 407, the method 400 includes identifying a gesture input based on a difference in light measurements. For example, responsive to a first light measurement being greater than a second light measurement, the processor 106 may determine that something, i.e., a user's hand, is blocking or touching the photodetector 102 and may identify this as a user gesture to execute a quick function.

At step 408, the method 400 includes identifying from the user gesture, a hardware component and a change to an operational state of the hardware component. As described above, this may be based on a user-defined mapping, an administrator-defined mapping, or some other mapping.

Accordingly, at step 409, the method 400 includes changing the operational state of the hardware component based on the mapping.

FIG. 5 depicts a non-transitory machine-readable storage medium 514 for activating a photodetector 102, according to an example. As used in the present specification, the term "non-transitory" does not encompass transitory propagating signals.

To achieve its desired functionality, a computing device 100 includes various hardware components. Specifically, a computing device 100 includes a processor 106 and a machine-readable storage medium 514. The machine-readable storage medium 514 is communicatively coupled to the processor. The machine-readable storage medium 514 includes a number of instructions 516, 518, 520, 522, 524, 526 for performing a designated function. The machine-readable storage medium 514 causes the processor to execute the designated function of the instructions 516, 518, 520, 522, 524, 526. The machine-readable storage medium 514 can store data, programs, instructions, or any other machine-readable data that can be utilized to operate the computing device 100. Machine-readable storage medium 514 can store computer readable instructions that the processor 106 of the computing device 100 can process, or execute. The machine-readable storage medium 514 can be an electronic, magnetic, optical, or other physical storage device that contains or stores executable instructions. Machine-readable storage medium 514 may be, for example, Random Access Memory (RAM), an Electrically Erasable Programmable Read-Only Memory (EEPROM), a storage device, an optical disc, etc. The machine-readable storage medium 514 may be a non-transitory machine-readable storage medium 514.

Detect state instructions 516, when executed by the processor 106, cause the processor 106 to, detect when the computing device 100 is in a detection state. Activate photodetector instructions 518, when executed by the processor 106, cause the processor 106 to activate a photodetector 102 responsive to the computing device 100 being in the detection state. Measure light instructions 520, when executed by the processor 106, cause the processor 106 to, measure an amount of light incident on a detection surface of the photodetector 102, receive a first light measurement from the photodetector 102, and receive a second light measurement from the photodetector 102. Identify gesture instructions 522, when executed by the processor 106, cause the processor 106 to identify a user gesture based on a difference between the first light measurement and the second light measurement, wherein a user gesture blocks light incident on the detection surface. Identify hardware component instructions 524, when executed by the processor 106, cause the processor 106 to identify from the user gesture, a hardware component of the computing device and a change to an operational state of the hardware component. Change operational state instructions 526, when executed by the processor 106, cause the processor 106 to change the operational state of the hardware component based on the user gesture.

What is claimed is:

1. A computing device, comprising:
a photodetector to measure an amount of light incident on a detection surface of the photodetector;
a state sensor to activate the photodetector responsive to the computing device being in a detection state, wherein the state sensor is an accelerometer to detect a tap input on the computing device;
a processor to:
identify, during the detection state, a user gesture based on an output of the photodetector, wherein the user gesture blocks light incident on the detection surface of the photodetector; and
execute an operation of the computing device when:
the accelerometer detects a tap input; and
the photodetector detects a user gesture based on a detected reduced amount of light upon the detection surface.

2. The computing device of claim 1, further comprising a database comprising a mapping between identified user gestures and alterations.

3. The computing device of claim 1, wherein the accelerometer is to confirm the user gesture based on the output of the photodetector.

4. The computing device of claim 1, wherein the state sensor is to detect that the computing device is in the detection state based on a first detected condition and a second detected condition.

5. The computing device of claim 4, wherein:
the first detected condition is a user physical interaction at a particular region of the computing device; and
the second detected condition is an open state of the computing device.

6. The computing device of claim 1, further comprising a hinge angle sensor of the computing device.

7. The computing device of claim 1, further comprising a hall sensor of the computing device.

8. The computing device of claim 1, wherein the gesture input is a physical tap on the photodetector.

9. The computing device of claim 1, further comprising a physical indicium of a gesture region wherein the photodetector is to detect a user gesture input.

10. A computing device, comprising:
an ambient light sensor to measure an amount of light incident on a detection surface of the ambient light sensor;
a presence sensor to detect a user presence in front of the computing device;
a processor to:
activate the ambient light sensor responsive to user presence in front of the computing device;
identify a user gesture based on a first light measurement and a second light measurement from the ambient light sensor, wherein the user gesture is a finger tap on the ambient light sensor which blocks light incident on the detection surface of the ambient light sensor;
differentiate a first user gesture from a second user gesture based on a sequence of light measurements from the ambient light sensor; and
switch an operational state of a hardware component of the computing device responsive to the user gesture.

11. The computing device of claim 10, wherein the presence sensor is:
a time-of-flight camera;
an artificial intelligence camera;
a microwave sensor;
a facial recognition sensor;
an eye-tracking sensor; or
a combination thereof.

12. The computing device of claim 10, wherein:
the first user gesture is a tap of the ambient light sensor; and
the second user gesture is a double tap of the ambient light sensor.

13. The computing device of claim 10, wherein the processor is to generate a mapping between a user-created gesture input and a state to which the hardware component is to be set.

14. The computing device of claim 10, wherein the ambient light sensor is disposed under a display panel of the computing device.

15. The computing device of claim 10, wherein the ambient light sensor is disposed in a bezel of the computing device.

16. The computing device of claim 10, wherein the hardware component is an input/output device.

17. A non-transitory machine-readable storage medium encoded with instructions executable by a processor of a computing device to, when executed by the processor, cause the processor to:
detect, with a hinge sensor of the computing device, that the computing device is in a detection state;
responsive to detecting the computing device is in the detection state:

activate a photodetector the computing device;
detect, with an accelerometer, a finger tap input at the computing device;
measure an amount of light incident on a detection surface of the photodetector;
receive a first light measurement from the photodetector;
receive a second light measurement from the photodetector;
identify a user gesture based on a difference between the first light measurement and the second light measurement, wherein the user gesture blocks light incident on the detection surface;
identify from the user gesture, a hardware component of the computing device and a change to an operational state of the hardware component; and
change the operational state of the hardware component based on:
    the user gesture detected by the photodetector; and
    a detected finger tap input by the accelerometer.

18. The non-transitory machine-readable storage medium of claim 17, wherein the hardware component comprises:
    a microphone of the computing device;
    a speaker of the computing device;
    a camera of the computing device;
    a network interface card of the computing device; or
    a combination thereof.

19. The non-transitory machine-readable storage medium of claim 17, further comprising instructions executable by the processor of the computing device to receive a user indication of the change of the operational state of the hardware device to assign to the user gesture.

20. The computing device of claim 1, wherein the photodetector is adjacent the accelerometer.

* * * * *